United States Patent
Shaw

(10) Patent No.: US 11,320,919 B2
(45) Date of Patent: May 3, 2022

(54) TOUCH AND DISPLAY DRIVER INTEGRATION CIRCUIT

(71) Applicant: Sitronix Technology Corporation, Jhubei (TW)

(72) Inventor: Hsuan-Yi Shaw, Jhubei (TW)

(73) Assignee: SITRONIX TECHNOLOGY CORPORATION, Jhubei (TW)

( * ) Notice: Subject to any disclaimer, the term of this patent is extended or adjusted under 35 U.S.C. 154(b) by 0 days.

(21) Appl. No.: 16/220,132

(22) Filed: Dec. 14, 2018

(65) Prior Publication Data

US 2019/0317630 A1 Oct. 17, 2019

Related U.S. Application Data

(60) Provisional application No. 62/598,830, filed on Dec. 14, 2017.

(51) Int. Cl.
*G06F 3/041* (2006.01)
*G06F 3/047* (2006.01)

(52) U.S. Cl.
CPC .......... *G06F 3/0412* (2013.01); *G06F 3/047* (2013.01); *G09G 2310/08* (2013.01)

(58) Field of Classification Search
CPC ...... G06F 3/0416; G06F 3/0412; G06F 3/041; G06F 3/038; G06F 3/04166; G06F 3/0446; G06F 3/04184; G06F 3/044; G06F 3/0443; G06F 3/0488; G06F 3/0445; G06F 3/04883; G06F 3/0482; G06F 3/04164; G06F 2203/04101
See application file for complete search history.

(56) References Cited

U.S. PATENT DOCUMENTS

| | | | |
|---|---|---|---|
| 10,739,994 B2 * | 8/2020 | Kim | G06F 3/045 |
| 2011/0012854 A1 * | 1/2011 | Liu | G06F 3/0416 345/173 |
| 2011/0157064 A1 * | 6/2011 | Imai | G06F 3/0416 345/173 |
| 2011/0193817 A1 * | 8/2011 | Byun | G06F 3/04184 345/174 |
| 2014/0022185 A1 * | 1/2014 | Ribeiro | G06F 3/0412 345/173 |
| 2014/0062899 A1 * | 3/2014 | Lee | G06F 3/0446 345/173 |
| 2015/0097799 A1 | 4/2015 | Buuck et al. | |
| 2015/0277657 A1 | 10/2015 | Azumi et al. | |

(Continued)

FOREIGN PATENT DOCUMENTS

| | | |
|---|---|---|
| CN | 201681361 U | 12/2010 |
| CN | 104102382 A | 10/2014 |

(Continued)

*Primary Examiner* — Dong Hui Liang
(74) *Attorney, Agent, or Firm* — Locke Lord LLP; Tim Tingkang Xia, Esq.

(57) ABSTRACT

The present invention discloses a touch and display driver integration circuit, which includes a touch circuit and a display driver circuit. The touch circuit generates a status signal standing for the status of the touch circuit. The display driver circuit is coupled to the touch circuit and transmits at least one signal and/or at least one information to the touch circuit according to the status signal so as to drive the touch circuit.

15 Claims, 4 Drawing Sheets

(56) References Cited

U.S. PATENT DOCUMENTS

| | | | | |
|---|---|---|---|---|
| 2015/0309649 A1* | 10/2015 | Lee | ............... | G06F 3/0416 |
| | | | | 345/173 |
| 2017/0205943 A1* | 7/2017 | Uchiyama | ............ | G06F 3/04166 |
| 2019/0004633 A1* | 1/2019 | Uchida | ............ | G06F 3/0488 |
| 2019/0163322 A1* | 5/2019 | Lee | ............... | G01R 31/2829 |
| 2019/0179484 A1* | 6/2019 | Jang | ............... | G06F 3/0418 |

FOREIGN PATENT DOCUMENTS

| | | |
|---|---|---|
| CN | 104317462 A | 1/2015 |
| TW | 201303427 A | 1/2013 |
| TW | 201428571 A | 7/2014 |
| TW | I515625 B | 1/2016 |

\* cited by examiner (FIG. 2)

[FIG. 3]

TOUCH AND DISPLAY DRIVER INTEGRATION CIRCUIT

CROSS REFERENCE TO RELATED APPLICATION

All related applications are incorporated by reference. The present application is based on, and claims priority from, U.S. Provisional Application Ser. No. 62/598,830, filed on Dec. 14, 2017, the disclosure of which is hereby incorporated by reference herein in its entirety.

TECHNICAL FIELD

The present invention relates generally to a driver circuit, and particularly to a touch and display driver integration circuit.

BACKGROUND

With the advance in technology, the functions of mobile devices, such as smart phones, tablet computers, notebook computers, etc., are more and more powerful, which makes our life more convenient. Currently, mobile devices have become indispensable to our life. Accordingly, various circuits applied to mobile devices have become the currently development trend. Touch and display driver integration (TDDI) circuit integrates the display driver circuit with the touch circuit, so has the functions of both of the display driver circuit and the touch circuit. Therefore, TDDI circuit has become the major solution for the touch technology for now.

Currently, a lot of technologies related to TDDI have be developed to improve the performance of TDDI, such as Taiwan Patent No. 1515625 "ELECTRONIC DEVICE AND METHOD FOR CONTROLLING THE SAME". However, currently available TDDI circuits still have many shortcomings to be improved. For example, a TDDI circuit usually includes a display driver circuit and a touch circuit. The display driver circuit should transmit at least one signal to the touch circuit, such as touch scanning frame synchronization signal (TSVD) and touch scanning line synchronization signal (TSHD). However, if the display driver circuit transmits the signal to the touch circuit before the touch circuit enters the normal operating status, the touch circuit cannot operate according to the received signal because the touch circuit has yet to enter the normal operating status. Thus, the TDDI circuit may malfunction.

Therefore, it has become an important issue to provide a TDDI circuit capable of improving the above shortcomings of currently available TDDI circuits.

SUMMARY

An object of the present invention to provide a TDDI circuit in order to improving the above shortcomings of currently available TDDI circuits.

To achieve the foregoing objective, the present invention provides a TDDI circuit, which includes a touch circuit and a display driver circuit. The touch circuit generates a status signal standing for the status of the touch circuit. The display driver circuit is coupled to the touch circuit and transmits at least one signal and/or at least one information to the touch circuit according to the status signal so as to drive the touch circuit.

Besides, the present invention further discloses that when the level of the status signal is the enable level, the status signal represents that the touch circuit is in the normal operating status, and the display driver circuit transmits the at least one signal and/or the at least one information to the touch circuit. In addition, when the display driver circuit detects that the level of the status signal is the disable level and the condition lasts for a reset time interval, the display driver circuit transmits a reset signal to the touch circuit to reset the touch circuit. After the touch circuit is reset by the display driver circuit for at least one time, the display driver circuit re-detects the level of the status signal and transmits a warning signal when the level of the status signal is still the disable level and the condition lasts for the reset time interval.

As described above, the TDDI circuit according to the present invention has one or more of the following advantages:

In one embodiment of the present invention, the touch circuit actively transmits the status signal standing for the status of the touch circuit to the display driver circuit, so the display driver circuit determines whether the touch circuit enters the normal operating status, and transmits the signal to the touch circuit after the touch circuit enters the normal operating status. Thus, the mechanism may effectively prevent the TDDI circuit from malfunctioning.

In one embodiment of the present invention, the display driver circuit determines whether the touch circuit enters the normal operating status according to the status signal of the touch circuit and transmits the information to the touch circuit after the touch circuit enters the normal operating status, which confirms the operating statuses of the display driver circuit and the touch circuit. For example, the operating status of the display driver circuit is synchronized with that of the touch circuit.

In one embodiment of the present invention, the display driver circuit may provide the reset mechanism, so the display driver circuit may transmit the reset signal to the touch circuit after the touch circuit fails to enter the normal operating status within a period of time in order to reset the touch circuit.

In one embodiment of the present invention, the display driver circuit may provide the abnormal detection mechanism, such that the display driver circuit may transmit a warning signal so as to warn the user about the abnormal condition after determining that the touch circuit cannot be reset.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it represents that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
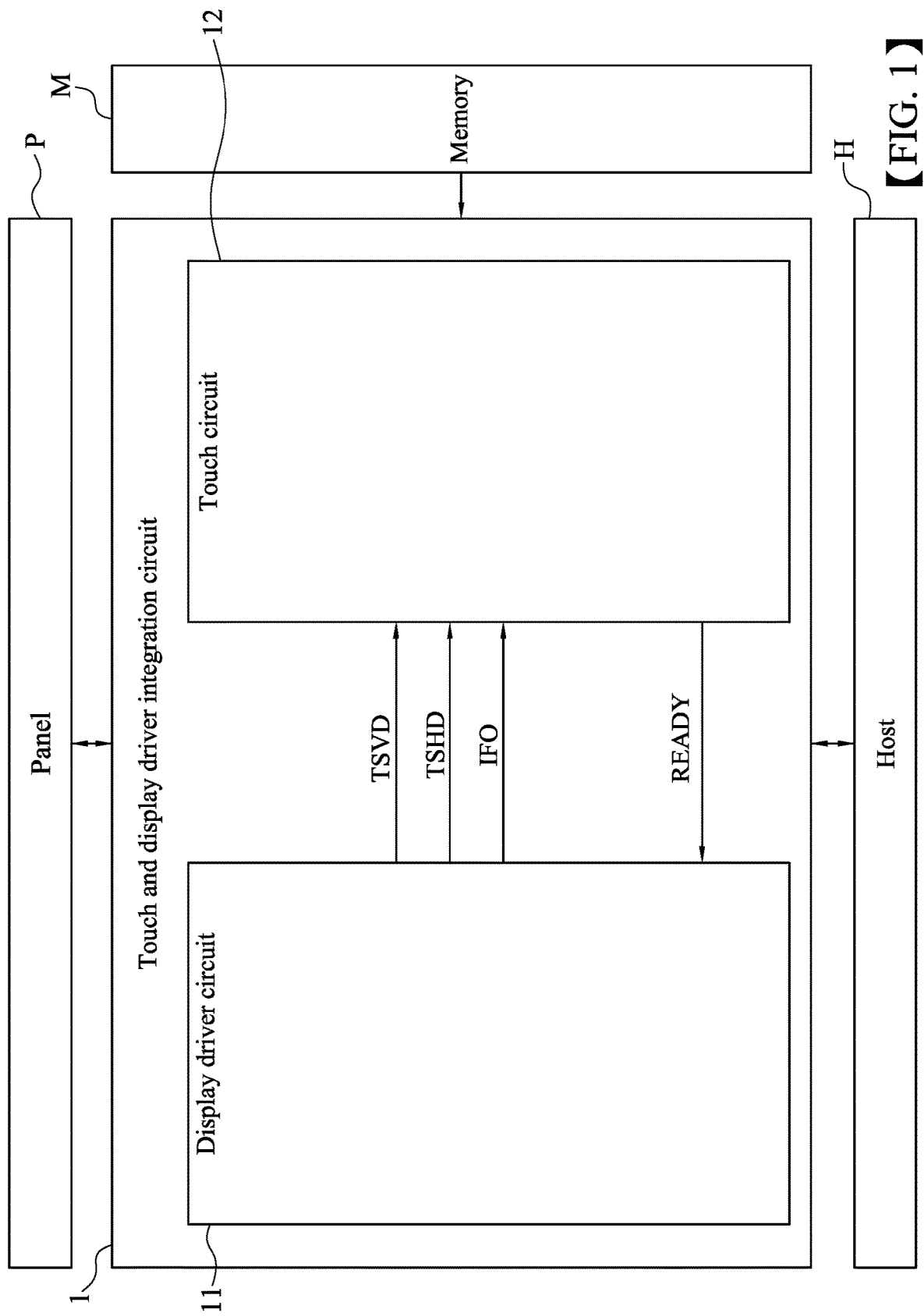
FIG. 1 is a circuit diagram of a TDDI circuit of a first embodiment in accordance with the present invention.

Please refer to FIG. 1, which shows a circuit diagram of a TDDI circuit of a first embodiment in accordance with the present invention. As shown in FIG. 1, the touch and display driver integration (TDDI) circuit 1 is coupled to a panel P, a host H and a memory M. The TDDI circuit 1 includes a touch circuit 12 and a display driver circuit 11. The panel P may be a touch display panel and the host H may be the processor of an electronic device.

The touch circuit 12 is coupled to the display driver circuit 11, generates a status signal READY and transmits the status signal READY to the display driver circuit 11; the status signal READY stands for the current status of the touch circuit 12. When starting operation, the touch circuit 12 downloads a plurality of parameters from the memory M first and then determines whether these parameters are correct. Afterwards, the touch circuit 12 implements the initialization process; for example, the touch circuit 12 performs relevant settings according to the downloaded parameters. When the touch circuit 12 fails to completely download the parameters or the initialization process does not be finished, the level of the status signal READY transmitted by the touch circuit 12 is the disable level. In a preferred embodiment, the touch circuit 12 determines whether the initialization process is finished by detecting the status values saved in the status registers (not shown in the drawings). On the contrary, when the touch circuit 12 completely downloads the parameters and finishes the initialization process, the level of the status signal READY transmitted by the touch circuit 12 is the enable level.

The display driver circuit 11 transmits at least one signal to the touch circuit 12 according to the status signal READY for driving the touch circuit 12. In the embodiment, the aforementioned signals may include (but not limited to) the touch scanning frame synchronization signal TSVD and the touch scanning line synchronization signal TSHD. More specifically, when the level of the status signal READY is the disable level, the display driver circuit 11 determines that the touch circuit 12 is still in the initialization status rather than the normal operating status. In this case, the display driver circuit 11 does not transmit the touch scanning frame synchronization signal TSVD and the touch scanning line synchronization signal TSHD to the touch circuit 12. On the contrary, when the level of the status signal READY is the enable level, the display driver circuit 11 determines that the touch circuit 12 has entered the normal operating status. In this case, the display driver circuit 11 transmits the touch scanning frame synchronization signal TSVD and the touch scanning line synchronization signal TSHD to the touch circuit 12 in order to drive the touch circuit 12.

As described above, the touch circuit 12 actively transmits the status signal READY standing for the status of the touch circuit 12 to the display driver circuit 11, so the display driver circuit 11 effectively determines whether the touch circuit 12 enters the normal operating status and transmits the signals to the touch circuit 12 after the touch circuit 12 enters the normal operating status. The above mechanism may prevent the TDDI circuit 1 from malfunctioning. Similarly, the display driver circuit 11 transmits at least one information IFO to the touch circuit 12 according to the status signal READY, such as operating information. The operating information includes the information (e.g. operating frequency) about the operation of the display driver circuit 11 in order to provide the operating information for the touch circuit 12. In this way, the touch circuit 12 may be synchronized with the display driver circuit 11.

Figure 2:
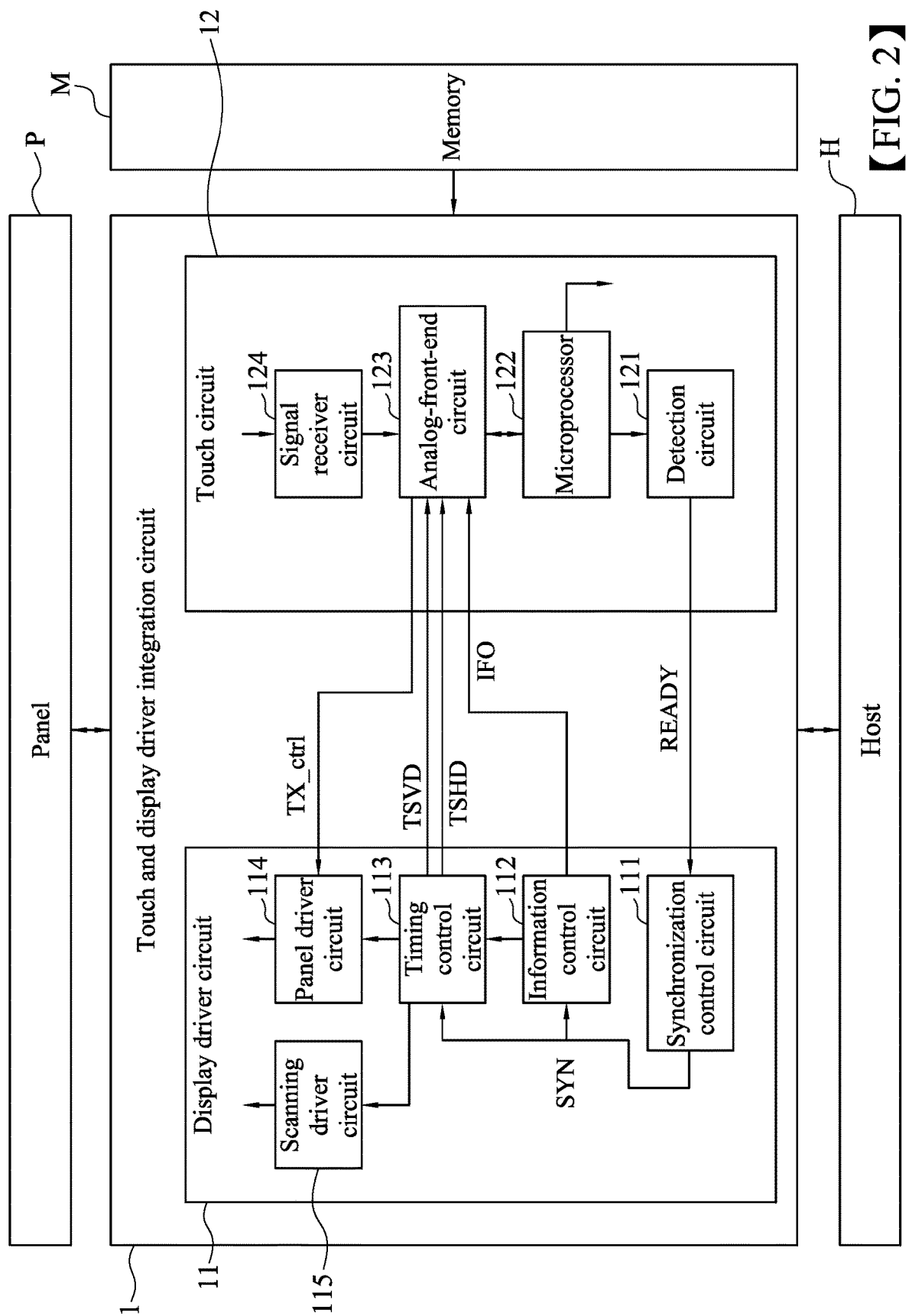
FIG. 2 is a circuit diagram of a TDDI circuit of a second embodiment in accordance with the present invention.

Please refer to FIG. 2, which shows a circuit diagram of a TDDI circuit of a second embodiment in accordance with the present invention. As shown in FIG. 2, the touch circuit 12 further includes a detection circuit 121, a microprocessor 122, an analog-front-end (AFE) circuit 123 and a signal receiver circuit 124. The detection circuit 121 is coupled to the microprocessor 122; the microprocessor 122 is coupled to the AFE circuit 123; the AFE circuit 123 is coupled to the signal receiver circuit 124.

The display driver circuit 11 further includes a synchronization control circuit 111, an information control circuit 112, a timing control circuit 113, a panel driver circuit 114 and a scanning driver circuit 115. The synchronization control circuit 111 is coupled to the information control circuit 112 and the timing control circuit 113; the information control circuit 112 is coupled to the timing control circuit 113; the timing control circuit 113 is coupled to the panel driver circuit 114 and the scanning driver circuit 115.

The detection circuit 121 detects the status (e.g. the status values saved in the status registers) of the touch circuit 12, generates the status signal READY according to the status of the touch circuit 12 and transmits the status signal READY to the synchronization control circuit 111. When the touch circuit 12 starts operation, the microprocessor 122 downloads a plurality of parameters from the memory M and further determines whether these parameters are correct. Then, the microprocessor 122 implements the initialization process to perform relevant settings. When the detection circuit 121 detects that the touch circuit 12 does not finish the initialization process (i.e. not in the normal operating status), the level of the status signal READY transmitted by the detection circuit 121 is the disable level. On the contrary, when the touch circuit 12 enters the normal operating status, the level of the status signal READY transmitted by the touch circuit 12 is the enable level.

The synchronization control circuit 111 is coupled to the detection circuit 121 of the touch circuit 12; the synchronization control circuit 111 detects the level of the status signal READY, generates a synchronization signal SYN according to the status signal READY and transmits the synchronization signal SYN to the timing control circuit 113. Then, the timing control circuit 113 transmits the touch scanning frame synchronization signal TSVD and the touch scanning line synchronization signal TSHD to the AFE circuit 123 according to the synchronization signal SYN so as to drive the touch circuit 12. When the level of the status signal READY is the disable level, the synchronization control circuit 111 determines that the touch circuit 12 is still in the initialization status instead of the normal operating status. In this case, the synchronization control circuit 111 controls the timing control circuit 113 not to transmit the touch scanning frame synchronization signal TSVD and the touch scanning line synchronization signal TSHD to the AFE circuit 123 of the touch circuit 12. On the contrary, when the level of the status signal READY is the enable level, the synchronization control circuit 111 determines that the touch circuit 12 is in the normal operating status. The synchronization control circuit 111 controls the timing control circuit 113 to transmit the touch scanning frame synchronization signal TSVD and the touch scanning line synchronization signal TSHD to the AFE circuit 123 in order to drive the touch circuit 12. In other words, the timing control circuit 113 transmits the touch scanning frame synchronization signal TSVD and the touch scanning line synchronization signal TSHD to the touch circuit 12 according to the status signal READY. In another embodiment, the synchronization control circuit 111 may be omitted and the detection circuit 121 may directly transmit the status signal READY to the timing control circuit 113 to perform the above control mechanism.

As described above, according to the embodiment of the present invention, the touch circuit 12 may actively transmit the status signal READY standing for the status of the touch circuit 12 to the display driver circuit 11, so the display driver circuit 11 determines whether the touch circuit 12 is in the normal operating status and transmits the signals to the touch circuit 12 only after the touch circuit 12 is in the normal operating status. In this way, the touch circuit 12 will not receive the signals before entering the normal operating status, so may precisely operate according to the signals, which effectively prevents the TDDI circuit 1 from malfunctioning.

The synchronization control circuit 111 further transmits the synchronization signal SYN to the information control circuit 112 according to the status signal READY in order to control the information control circuit 112 to transmit at least one information IFO to the AFE circuit 123. In the embodiment, the above information IFO may be operating information, such as operating frequency, etc. Similarly, when the level of the status signal READY is the enable level, the synchronization control circuit 111 determines that the touch circuit 12 is in the normal operating status. In this case, the synchronization control circuit 111 controls the information control circuit 112 to transmit the information IFO to the touch circuit 12, so the AFE circuit 123 of the touch circuit 12 may obtain the operating information of the display driver circuit 11. Therefore, the touch circuit 12 may be synchronized with the display driver circuit 11. As described above, the information control circuit 112 may transmit the information IFO to the touch circuit 12 according to the status signal READY. In other words, the display driver circuit 11 determines whether the touch circuit 12 is in the normal operating status according to the status signal READY of the touch circuit 12 and transmits the information IFO to the touch circuit 12 after the touch circuit 12 enters the normal operating status. The above mechanism may make sure that the touch circuit 12 definitely receives the information IFO, so the TDDI circuit 1 performs the desired operation. In another embodiment, the synchronization control circuit 111 may be omitted and the detection circuit 121 directly transmits the status signal READY to the information control circuit 112 so as to perform the above control mechanism.

When the touch circuit 12 is in the normal operating status and receives the touch scanning frame synchronization signal TSVD and the touch scanning line synchronization signal TSHD, the AFE circuit 123 transmits the drive control signal TX_ctrl to the panel driver circuit 114 according to the touch scanning frame synchronization signal TSVD and the touch scanning line synchronization signal TSHD. Next, the panel driver circuit 114 transmits a touch drive signal to the panel P according to the drive control signal TX_ctrl and then the panel P generates the panel sensing signal according to the touch drive signal. Afterwards, the signal receiver circuit 124 receives the panel sensing signal from the panel P and transmits the panel sensing signal to the AFE circuit 123. The AFE circuit 123 processes the panel sensing signal and transmits the processed panel sensing signal to the microprocessor 122 for the microprocessor 122 to determine the position where a touch device, such as stylus pen or finger, contacts the panel P and transmit the position to the host H. Finally, the host H may perform corresponding operation according to the position where the touch device contacts the panel P. Further, the timing control circuit 113 may control the scanning driver circuit 115 and the panel driver circuit 114. More specifically, the scanning driver circuit 115 generates plural scanning signals and transmits the scanning signals to the panel P so as to scan the pixel units of the panel P; the panel driver circuit 114 generates plural data signals and transmits the data signals to the panel P when the scanning driver circuit 115 is scanning the pixel units of the panel P in order to drive the panel P to display the desired content. In addition, the information control circuit 112 may further transmit the information IFO to the timing control circuit 113 to generate the signals.

Figure 3:
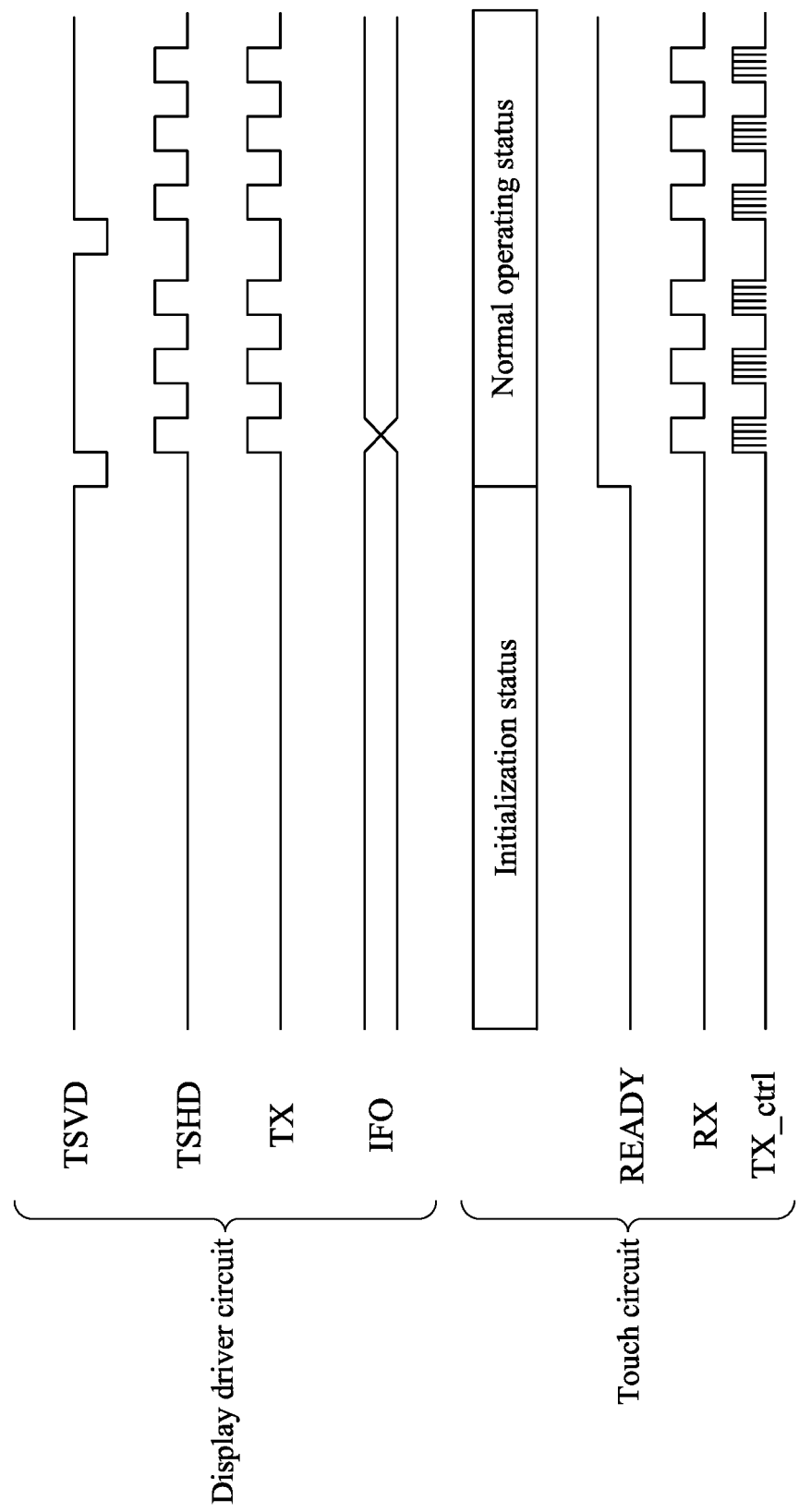
FIG. 3 is a timing diagram of signals and information of the TDDI circuit of the second embodiment in accordance with the present invention.

Please refer to FIG. 3, which is a timing diagram of signals and information of the TDDI circuit of the second embodiment in accordance with the present invention. As shown in FIG. 3, when the touch circuit 12 is in the initialization status, the level of the status signal READY is the disable level; the disable level may be, but not be limited to, low-level. In this case, the display driver circuit 11 does not transmit the information IFO and signals, such as the touch scanning frame synchronization signal TSVD and the touch scanning line synchronization signal TSHD, to the touch circuit 12.

When the touch circuit 12 is in the normal operating status, the level of the status signal READY is the enable level; the enable level may be, but not limited to, level-high. In this case, the display driver circuit 11 transmits the information IFO and the signals, such as the touch scanning frame synchronization signal TSVD and the touch scanning line synchronization signal TSHD, to the touch circuit 12. Then, the touch circuit 12 transmits the drive control signal TX_ctrl to the display driver circuit 11 according to the touch scanning frame synchronization signal TSVD and the touch scanning line synchronization signal TSHD. Afterwards, the display driver circuit 11 transmits the touch drive signal TX to the panel P according to the drive control signal TX_ctrl, and the panel P generates the panel sensing signals RX according to the touch drive signal TX. Finally, the touch circuit 12 receives the panel sensing signals RX and determines the position where the touch device contacts the panel P according to the panel sensing signals RX.

Moreover, when the TDDI circuit 1 suffers electrostatic discharge (ESD) or other abnormal conditions, the detection circuit 21 may also detect that the touch circuit 12 is not in the normal operating status. In this case, the level of the status signal READY generated by the detection circuit 121 is also changed from the enable level to the disable level in order to avoid that the display driver circuit 11 still keeps transmitting the signals and the information IFO to the touch circuit 12, which serves as a protection mechanism of the TDDI circuit 1. When the touch circuit 12 returns to the normal operating status after being automatically reset or reset by the user, the level of the status signal READY generated by the touch circuit 12 is changed from the disable level to the enable level. Then, the display driver circuit 11 re-transmits the information IFO and the signals to the touch circuit 12.

Figure 4:
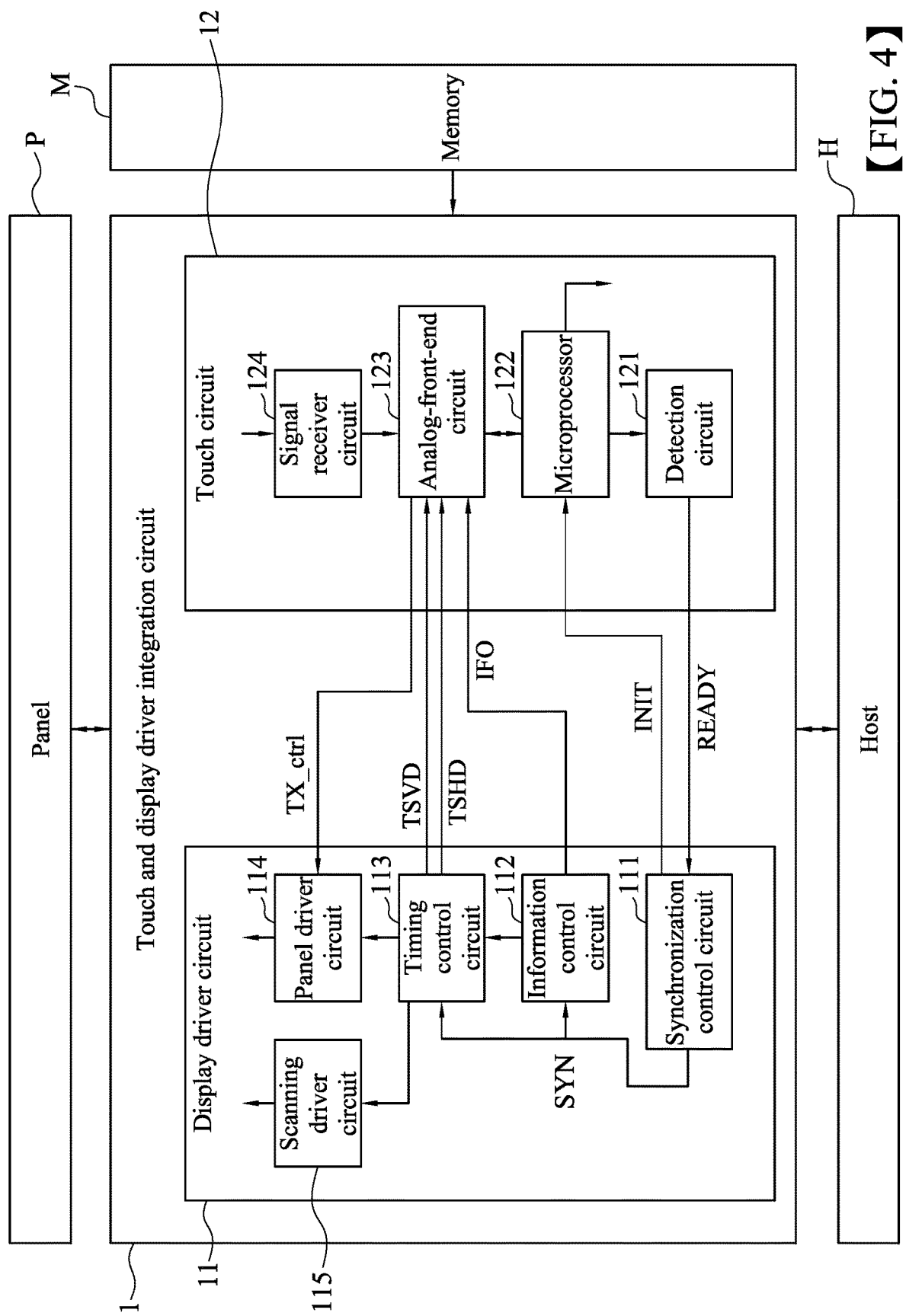
FIG. 4 is a circuit diagram of a TDDI circuit of a third embodiment in accordance with the present invention.

Please refer to FIG. 4, which shows a circuit diagram of a TDDI circuit of a fourth embodiment in accordance with the present invention. As shown in FIG. 4, the TDDI circuit 1 is coupled to the panel P, the host H and the memory M. The TDDI circuit 1 includes the touch circuit 12 and the display driver circuit 11.

The functions and the cooperation relation between the above elements are similar to the previous embodiment, so will not be described therein. The difference between the embodiment and the previous embodiment is that the display driver circuit 11 may provide a reset mechanism. More specifically, if the synchronization control circuit 111 detects that the level of the status signal READY is the disable level and the condition lasts for a reset time interval, the synchronization control circuit 111 transmits a reset signal INIT to the microprocessor 122 to reset the touch circuit 12.

Furthermore, the display driver circuit 11 may further provide an abnormal detection mechanism. More specifically, if the touch circuit 12 is reset by the synchronization control circuit 111, the synchronization control circuit 111 still keeps detecting the level of the status signal READY. If the level of the status signal READY is still the disable level and the condition lasts for the aforementioned reset time interval, the synchronization control circuit 111 re-transmits the reset signal INIT to the microprocessor 122 to reset the touch circuit 12 and detect the level of the status signal READY. If the level of the status signal READY is still the disable level and the condition lasts for the aforementioned reset time interval, the synchronization control circuit 111 transmits a warning signal to warn the user that the touch circuit 11 may malfunction for the user to perform necessary measures (e.g. reboot the electronic device with TDDI circuit 1). As described above, if the touch circuit 12 cannot enter the normal operating status after the touch circuit 12 is reset by the synchronization control circuit 111 for predetermined number of times, the display driver circuit 11 transmits the warning signal. In an embodiment, the predetermined number of times may be one time.

To sum up, according to one embodiment of the present invention, the touch circuit actively transmits the status signal standing for the status of the touch circuit to the display driver circuit, so the display driver circuit determines whether the touch circuit enters the normal operating status and transmit the signal or/and the information to the touch circuit after the touch circuit enters the normal operating status. Thus, the mechanism may effectively prevent the TDDI circuit from malfunctioning.

Besides, according to one embodiment of the present invention, the display driver circuit may provide the reset mechanism, so the display driver circuit may transmit the reset signal to the touch circuit after the touch circuit fails to enter the normal operating status within a period of time in order to reset the touch circuit.

Moreover, according to one embodiment of the present invention, the display driver circuit may provide the abnormal detection mechanism, such that the display driver circuit may transmit a warning signal so as to warn the user about the abnormal condition after determining that the touch circuit cannot be reset.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch and display driver integration circuit, comprising:
   a touch circuit, configured to generate a status signal standing for a status of the touch circuit, wherein the status of the touch circuit is the touch circuit being in a normal operating status, an initialization status or an abnormal status; and
   a display driver circuit, coupled to the touch circuit and configured to determine whether to transmit at least one signal and/or at least one information to the touch circuit or not according to the status signal in order to drive the touch circuit, wherein the display driver circuit transmits the at least one signal and/or the at least one information to the touch circuit when the status signal stands for the touch circuit being in the normal operating status, and the display driver circuit does not transmit the at least one signal and/or the at least one information to the touch circuit when the touch circuit is in the initialization status or the abnormal status.

2. The touch and display driver integration circuit of claim 1, wherein the at least one signal comprises a touch scanning frame synchronization signal and a touch scanning line synchronization signal.

3. The touch and display driver integration circuit of claim 2, wherein the display driver circuit further comprises a timing control circuit configured to transmit the touch scanning frame synchronization signal and the touch scanning line synchronization signal to the touch circuit according to the status signal.

4. The touch and display driver integration circuit of claim 3, wherein the display driver circuit further comprises a synchronization control circuit coupled to the touch circuit and configured to generate a synchronizing signal according to the status signal and transmit the synchronizing signal to the timing control circuit so as to drive the time timing control circuit to transmit the touch scanning frame synchronization signal and the touch scanning line synchronization signal to the touch circuit.

5. The touch and display driver integration circuit of claim 3, wherein the touch circuit further comprises an analog-front-end circuit and a signal receiver circuit, and the display driver circuit further comprises a panel driver circuit; the analog-front-end circuit transmits a drive control signal to the panel driver circuit according to the touch scanning frame synchronization signal and the touch scanning line synchronization signal, the panel driver circuit transmits a touch drive signal according to the drive control signal, and the signal receiver circuit receives at least one panel sensing signal.

6. The touch and display driver integration circuit of claim 1, wherein the display driver circuit further comprises a synchronization control circuit configured to transmits a reset signal to the touch circuit to reset the touch circuit when the synchronization control circuit detects that the level of the status signal is a disable level and the disable level lasts for a reset time interval.

7. The touch and display driver integration circuit of claim 6, wherein the touch circuit further comprises a microprocessor configured to receive the reset signal transmitted by the synchronization control circuit in order to reset the touch circuit.

8. The touch and display driver integration circuit of claim 6, wherein the synchronization control circuit re-detects the level of the status signal after the touch circuit is reset by the synchronization control circuit for at least one time, and transmits a warning signal when the level of the status signal is still the disable level and the disable level lasts for the reset time interval.

9. The touch and display driver integration circuit of claim 1, wherein when the display driver circuit detects that the level of the status signal is a disable level and the disable level lasts for a reset time interval, the display driver circuit transmits a reset signal to the touch circuit to reset the touch circuit.

10. The touch and display driver integration circuit of claim 9, wherein after the touch circuit is reset by the display driver circuit for at least one time, the display driver circuit re-detects the level of the status signal and transmits a warning signal when the level of the status signal is still the disable level and the disable level lasts for the reset time interval.

11. The touch and display driver integration circuit of claim 1, wherein the touch circuit further comprises a detection circuit configured to detect the status of the touch circuit and generate the status signal according to the status of the touch circuit.

12. The touch and display driver integration circuit of claim 11, wherein when the detection circuit detects that the touch circuit is in the normal operating status, a level of the status signal generated by the detection circuit is an enable level, and the display driver circuit transmits the at least one signal and/or at least one information to the touch circuit.

13. The touch and display driver integration circuit of claim 1, wherein when a level of the status signal is an enable level, the status signal represents that the touch circuit is in the normal operating status, and the display driver circuit transmits the at least one signal and/or the at least one information to the touch circuit.

14. The touch and display driver integration circuit of claim 1, wherein the display driver circuit further comprises an information control circuit configured to transmit the at least one information to the touch circuit according to the status signal.

15. The touch and display driver integration circuit of claim 14, wherein the display driver circuit further comprises a synchronization control circuit coupled to the touch circuit and configured to generate a synchronizing signal according to the status signal and transmit the synchronizing signal to the information control circuit in order to drive the information control circuit to transmit the at least one information to the touch circuit.

* * * * *